Jan. 17, 1939. R. R. BRIGHTWELL 2,144,448
WRAPPING MACHINE
Filed March 2, 1937 8 Sheets-Sheet 1

INVENTOR
Robert Roland Brightwell

Jan. 17, 1939.　　　R. R. BRIGHTWELL　　　2,144,448
WRAPPING MACHINE
Filed March 2, 1937　　　8 Sheets-Sheet 3

INVENTOR
Robert Roland Brightwell

Jan. 17, 1939.  R. R. BRIGHTWELL  2,144,448
WRAPPING MACHINE
Filed March 2, 1937  8 Sheets-Sheet 7

WITNESSES

INVENTOR
Robert Roland Brightwell
BY
Munn, Anderson & Liddy.
ATTORNEYS

Patented Jan. 17, 1939

2,144,448

UNITED STATES PATENT OFFICE 2,144,448

WRAPPING MACHINE

Robert Roland Brightwell, Philadelphia, Pa., assignor to Stephano Brothers, Philadelphia, Pa., a corporation of Pennsylvania Application March 2, 1937, Serial No. 128,596

3 Claims. (Cl. 93—2)

This invention relates to wrapping machines and relates particularly to machines for automatically wrapping an article, package, container or carton in a sheet of thin flexible material.

My invention is particularly applicable to machinery for automatically wrapping packages, such as cigarette packages, in "Cellophane" or similar transparent cellulose or cellulose ester sheets, but it may also be used to wrap various types of articles in paper or other flexible sheet material.

It is an object of the invention to provide a wrapping machine which is suitable for wrapping cigarette packages or the like in "Cellophane" or other flexible wrapping material and which may be connected directly to the packaging machine so that the packages can be automatically fed from the packaging machine to the wrapping machine without the necessity of manually transferring the packages from one machine to the other.

A further object is the provision of an improved machine which will automatically supply a desired length of wrapping material and then wrap the material around an article or package and also adhesively secure the wrapper in position.

Another object is the provision of an improved machine of the above character with automatically operating mechanism for stopping the operation of the machine when it becomes jammed and in which the feeding of the wrapping material automatically terminates when the supply of packages or other articles to be wrapped for some reason or other is cut off.

Another object is the provision in a machine of the above character for wrapping packages in "Cellophane," or other flexible sheet material, of improved folding mechanism particularly for tucking the ends of the wrapping material prior to folding the edges against the package.

Among other objects is the provision of an improved wrapping machine of simplified construction, which is economical to build and operate, which will operate for long periods of time with comparative freedom from repair and which will wrap articles or packages in "Cellophane", or other flexible sheet material, in a neat but secure manner.

For a fuller understanding of the invention reference should be had to the accompanying drawings in which—

My invention is particularly applicable to machines for wrapping cigarette packages in "Cellophane" or similar cellulose or cellulose ester material, and in the accompanying drawings my invention is illustrated as embodied in such a machine. However, it is to be understood that machines embodying my invention may be employed to wrap articles, packages, or containers of various kinds in any desired type of flexible sheet material.

A machine embodying my invention is provided with a suitable frame 1 having upright and transverse portions positioned so as to support the various parts of the machine which will be hereinafter described. One of the advantages of a machine embodying my invention is that it may receive packages directly from a packaging machine and then wrap them in wrapping material, such as "Cellophane" or the like, without the necessity of manually transferring the packages from one machine to the other. Thus, in the accompanying drawings the numeral 2 indicates a feed trough leading from a cigarette packaging machine, and the cigarette packages are fed directly from the trough 2 to the feed trough 3 of my wrapping machine, the feed trough 3 being in registry with the feed trough 2.

The packages are fed by the feeding mechanism of the cigarette packaging machine along the trough 3 until they reach the gate 4, when they are fed transversely of the machine along the feed trough 5 to the end thereof. The packages are then fed downwardly in a vertical direction, first picking up the "Cellophane" or other wrapping material and then passing through the vertical folding chute or track 6 which folds the "Cellophane" along the sides of the packages and adhesively secures the edges together. At the bottom of the vertical feed chute the packages are then fed transversely in a horizontal direction through another folding chute or track 7 where the "Cellophane" or other wrapping material is folded and adhesively secured over the top of the package. At the end of the chute 7 the packages are discharged, completely wrapped, into a suitable receptacle.

The mechanism whereby the packages are fed through the various parts of the machine and the mechanism for supplying the "Cellophane" or other wrapping material for folding around the package will now be described sequentially, that is, in the direction of feed through the machine.

The power for all the moving parts of the machine is supplied to the primary driving sprocket wheel 8 by means of the conventional type of roller chain 9, which is preferably connected to the cigarette packaging machine or to the same source of power which operates the cigarette packaging machine, so that the wrapping and the packaging machines may be operated in synchronism. The sprocket wheel 8 has associated therewith safety mechanism for automatically cutting off the source of power when the wrapping machine becomes jammed, and also a ratchet connection which permits of reversing of the packaging machine without corresponding reversal of the wrapping machine, and also permits of manual operation of the wrapping machine without causing the operation of the sprocket 8 and the chain 9.

Figure 2:
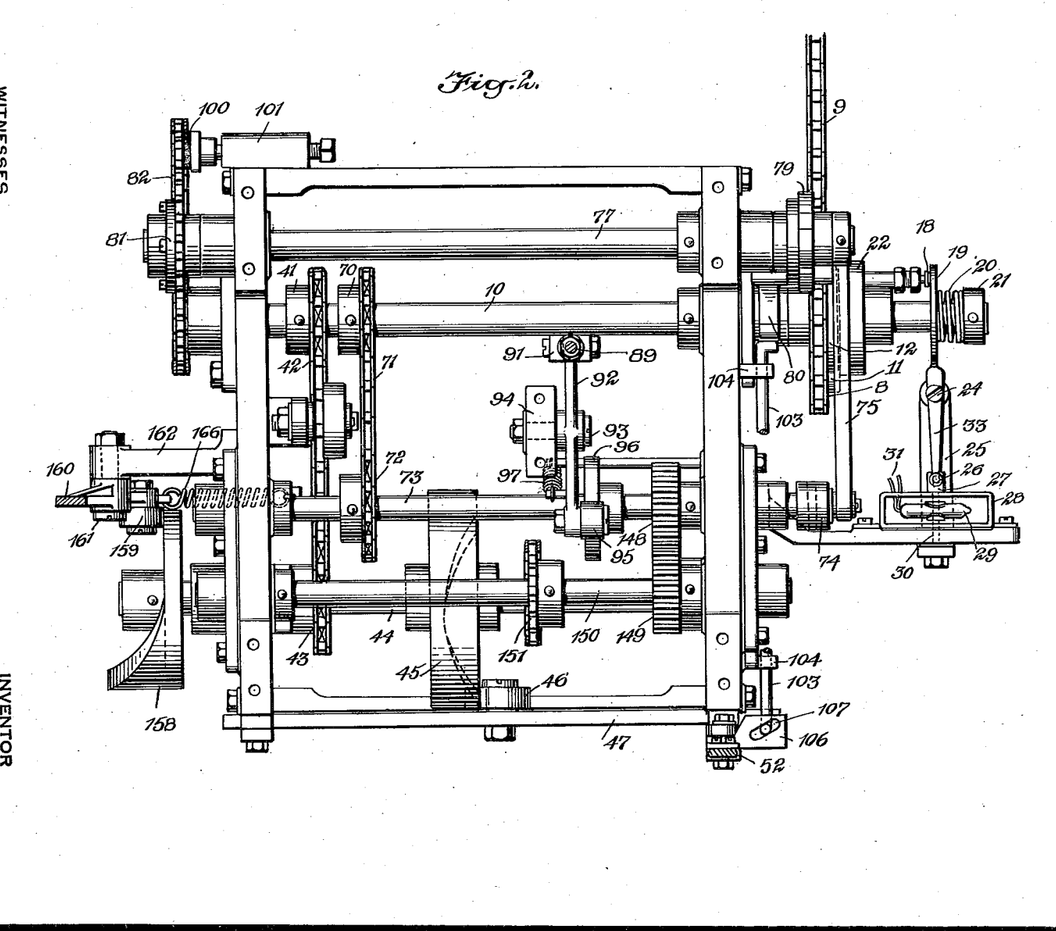
Fig. 2 is a plan view of the gears, sprockets, and associated mechanism for driving the various parts of the machine.
Figure 4:
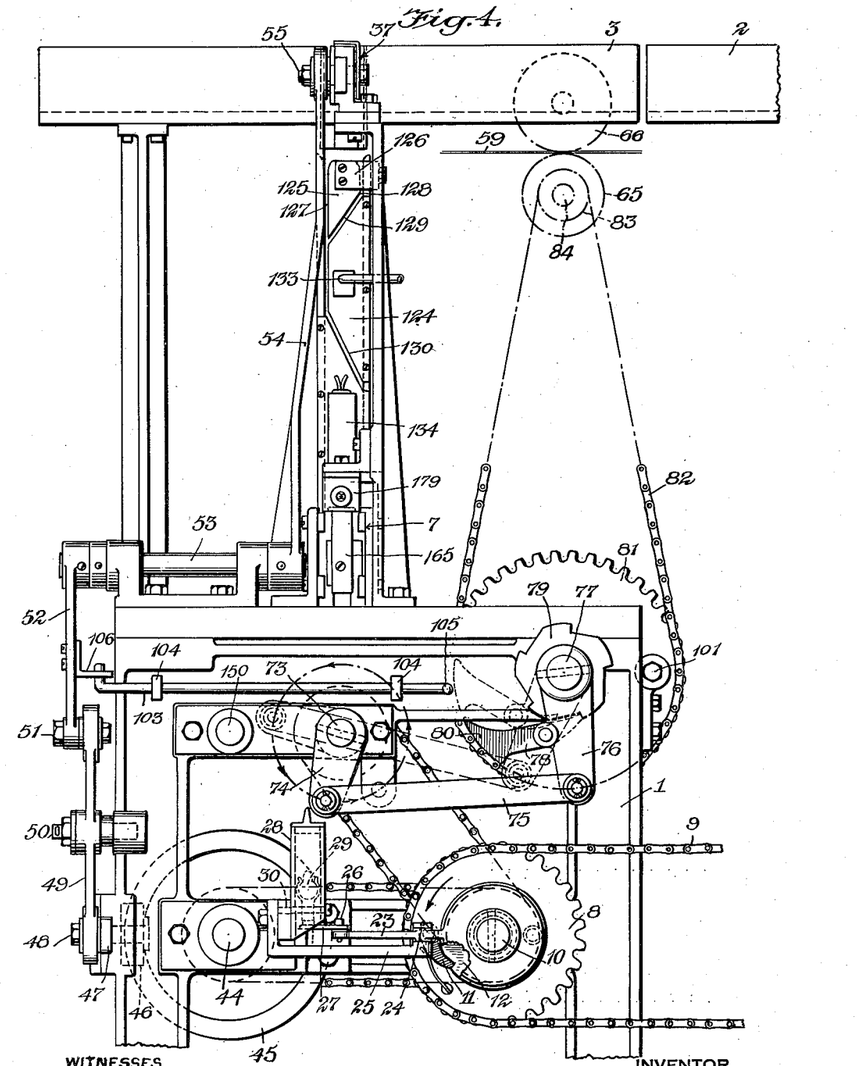
Fig. 4 is a side elevation in the opposite direction to Fig. 3, with portions omitted for the sake of clarity.
Figures 10, 12:
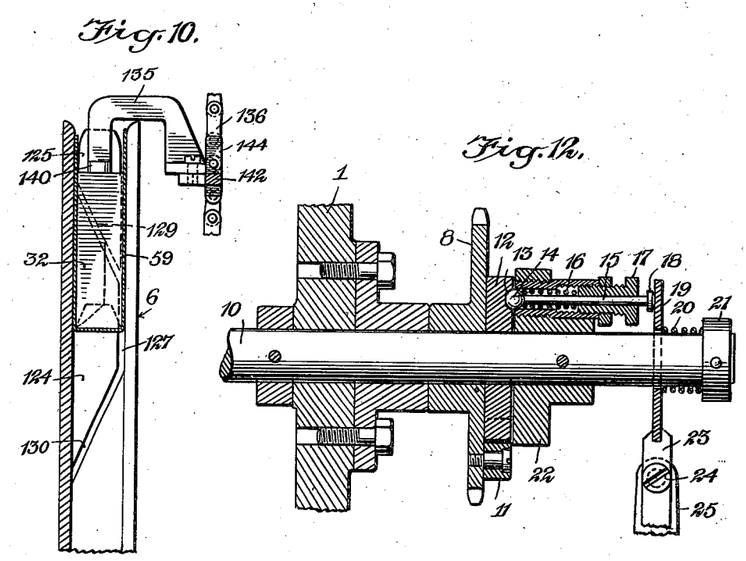
Fig. 10 is a sectional view in elevation of the upper end of the vertical folding chute, showing a feeding finger in position to feed a package downwardly through the chute.
Fig. 12 is a detail view partially in section of the primary driving sprocket and the automatic safety release associated therewith.
Figure 11:
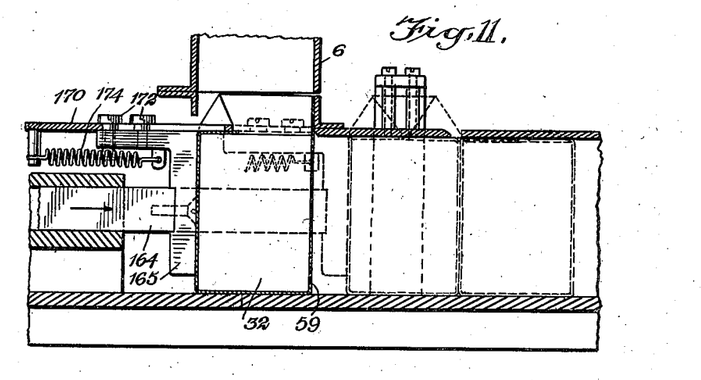
Fig. 11 is a sectional view of the beginning of the transverse folding chute, showing the manner in which the packages are fed therethrough and the manner in which the wrapping material is folded over the top of the packages.

This mechanism is shown more particularly in Figs. 2, 4 and 12. The sprocket 8 is mounted on a shaft 10 so that it is free to rotate thereon, and is provided with a pivoted spring-pressed pawl 11 which engages in the teeth of a ratchet 12 when the sprocket 8 is rotated in a direction to cause the operation of the wrapping machine. If the ratchet is rotated in the opposite direction the pawl will merely slide over the teeth without causing a rotation of the ratchet 12. The ratchet 12 is likewise mounted on the shaft 10 so as to be free to rotate thereabout and is provided on its outer face with a recess 13 for receiving the ball catch 14 mounted on the end of stem 15 and normally urged into engagement with the recess 13 by means of a helical spring 16, the tension of the spring 16 being adjustable by means of a screw-threaded plug 17. The stem 15 projects outwardly through the plug 17 and is provided at its outer end with a rounded head 18 which engages the collar or disk 19 disposed around the shaft 10 and normally held in the position shown in Fig. 12 by means of a helical spring 20 disposed between the disk 19 and collar 21.

The ball catch 14 and associated spring 16 are carried by the collar 22, which is keyed to shaft 10, and normally the rotation of the sprocket in the direction of feeding operation causes, through the medium of pawl 11, rotation of the ratchet 12, which in turn, through its interengagement with the catch 14, causes the rotation of collar 22 and shaft 10. Should the feeding mechanism of the machine become jammed, the catch 14 will be forced out of engagement with the recess 13 against the tension of the spring 16, with the result that the stem 15 will force the disk 19 towards the collar 21 against the tension of spring 20.

The disk 19 engages in a slot formed in the end of the arm 23 which is pivotally mounted at 24 to a bracket 25 carried by the frame of the machine. The other end of the arm 23 is pivotally connected at 26 to an arm 27 secured to the frame 28 in which a mercury switch 29 is mounted. The mercury switch is normally disposed in horizontal position so that the circuit is closed, and in order that it may be pivoted to open the circuit the frame 28 is provided with a pivotal mounting, as indicated in dotted lines at 30 in Figs. 2 and 4. In this way when the ball catch 14 is forced out of engagement with the recess 13, with the result that the disk 19 is shifted towards the collar 21, the arm 23 will be caused to pivot with the result that frame 28 will be tilted and the mercury switch will be opened thereby breaking the circuit. The mercury switch is connected by wires 31 into the circuit of the electric motor which causes the operation of the machinery, or to a relay for cutting off the power. Due to this mechanism, it will be appreciated that should the wrapping machine become jammed the mercury switch 29 will immediately cause the cutting off of the power with resultant cessation of operation of the machine. The pawl and ratchet connection between the sprocket 8 and the ratchet 12, as described above, permits of the reversal of the packaging machine or of the source of power without a corresponding reversing of the wrapping machine, and it also permits of the manual operation of the wrapping machine without affecting the sprocket 8 and the source of power.

As previously stated, the cigarette packages, which are indicated at 32, are fed from the discharge trough 2 of the packaging machine directly into the feed trough 3 of the wrapping machine and are then fed by the feeding mechanism of the packaging machine until they come into contact with the gate 4. The gate 4 is hingedly supported at 33 to the side of the fed trough 5 and is provided with a spring 34 which normally holds the gate in the position indicated in dotted lines at 35 in Fig. 1. When the packages 32 are fed forwardly into engagement with the gate 4, the gate is forced into the position indicated in full lines in Fig. 1 against the tension of the spring and a suitable releasable latch 4' is provided for preventing the gate 4 from being forced beyond that position. This latch or catch, however, can be released and the gate can be turned back to the position indicated in dotted lines at 36 in Fig. 1 when it is desired to discharge the packages 32 without wrapping them in "Cellophane" or a similar outer wrapping. However, when it is desired to encase the packages in a sheet of wrapping material, the latch or catch is adjusted so that the gate 4 can not be forced backwardly beyond the position shown in full lines.

Figure 1:
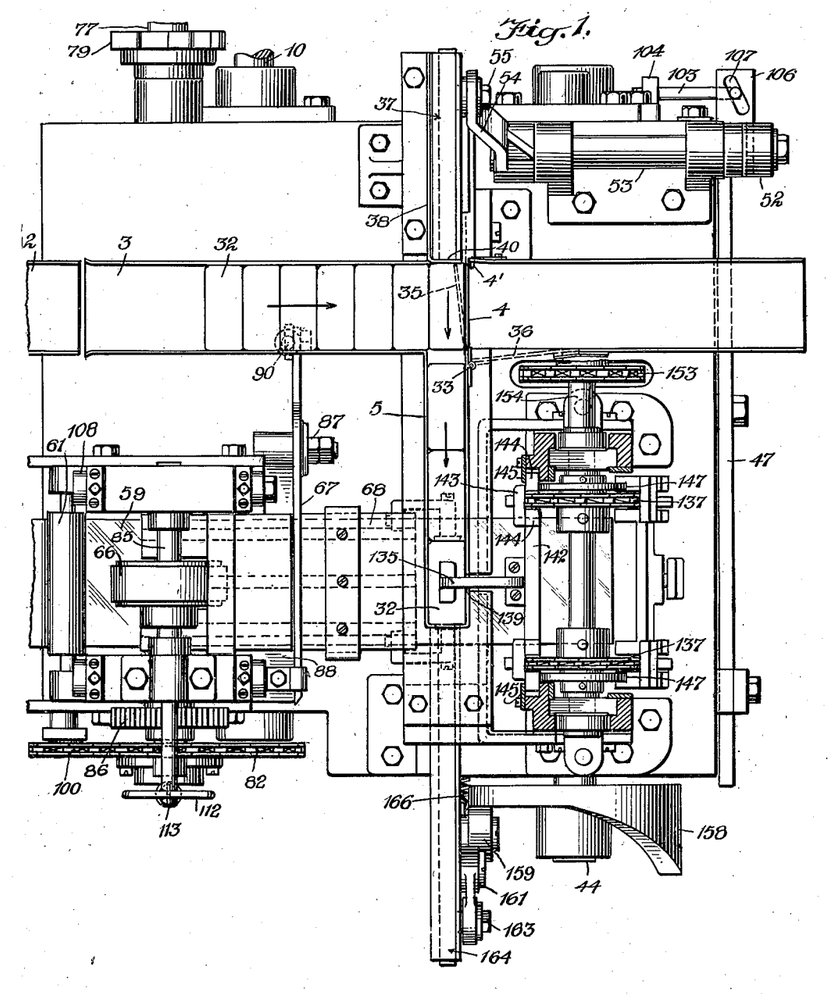
Fig. 1 is a plan view of a wrapping machine embodying my invention.

As each package reaches a position in engagement with the gate 4, forcing it back to the position shown in full lines in Fig. 1, it is automatically fed in the direction of the arrows along the feed chute 5. The mechanism for causing this feeding consists of a plunger 37 which reciprocates back and forth transversely of the machine across the end of the feed trough 3 so as to force each package into the feed trough 5. which reciprocation causes the feeding of the package engaged by the plunger a distance a little greater than the width of the package. The plunger, as shown, should be provided with a smooth side face or wall 38 which can feed across the trough 3 without any interference with the sides of the trough, and also with an abutment 40 at the end thereof and disposed at right angles to the side wall 38, which engages the side of the package and pushes it in the direction of the arrows when the plunger reciprocates. The reciprocation of the plunger 37 is accomplished by means of a spring, a cam, and a series of arms or levers controlled by the primary driving mechanism of the machine. This mechanism is shown most clearly in Figs. 2, 4 and 5.

It will be seen that the shaft 10 is connected by means of a sprocket 41, chain 42, and a sprocket 43 to a shaft 44 suitably journaled in the frame of the machine. Mounted on the shaft near the central portion thereof, is a wheel 45 having a peripheral flange presenting a cam surface thereon which is engaged by a follower or roller 46 carried on slide 47. At one end the slide 47 is pivotally connected, as at 48, to an arm 49 hinged or pivoted adjacent its central portion, as at 50 to the frame, and pivotally connected at its other end at 51 to an arm or link 52. The pivotal connections of the arm 49 at 48 and 51 should be slotted so as to permit relative limited movement to take care of variations in the radius.

The arm 52 is keyed to the end of a shaft 53 journaled in brackets mounted on the frame and the opposite end of the shaft 53 has keyed thereon a relatively elongated arm 54 which is pivoted at 55 by means of a slotted connection, to the plunger 37. To normally urge the upper end of the arm 54 and the plunger 37 into the position shown in dotted lines in Fig. 5, a spring 56 is connected between the upper end of the arm and a pin 57 mounted in the frame.

Figure 5:
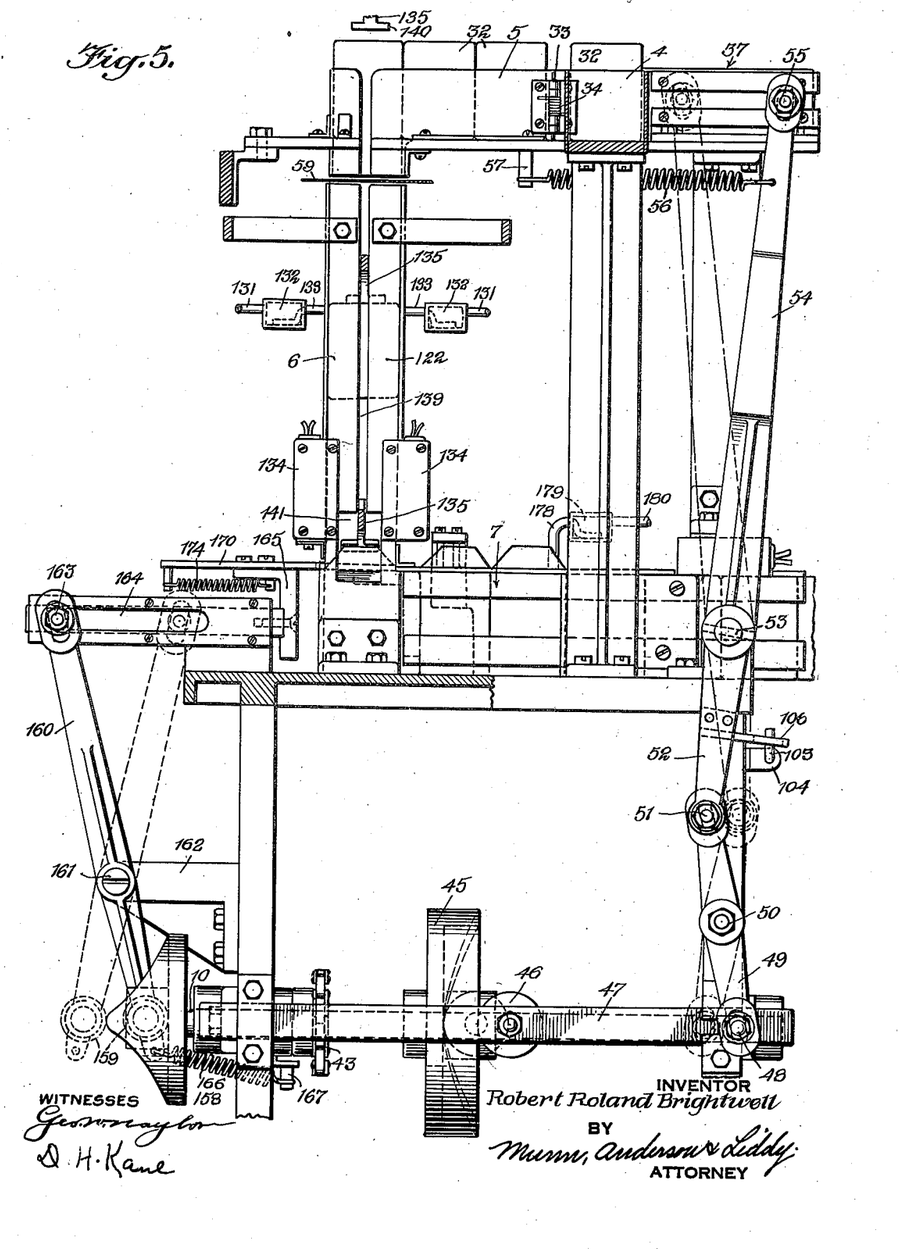
Fig. 5 is a detail view of the cams, levers, and associated mechanism for feeding the cigarette packages through the machine, in which portions of the machine are omitted for the sake of clarity.

It will be noted that the follower or roller 46 engages a flange formed around the periphery of the cam 45 and that the flange is provided with but a single valley or rest portion indicated in dotted lines in Figs. 2 and 5, the remainder of the flange being a dwell portion which holds the arms 49 and 54 in the position indicated in full lines in Fig. 5 with plunger 37 retracted. When the cam 45 has been rotated sufficiently so that the roller 46 comes into contact with the valley portion indicated in dotted lines, the spring 56 urges the arm 54 into the position shown in dotted lines in Fig. 5, thereby causing the plunger 37 to shift downwardly as viewed in Fig. 1 and feed a cigarette package into the transverse feed trough 5. When the roller 46 again comes into contact with the dwell portion of the cam, the arms 49 and 54 will be returned to the positions shown in full lines in Fig. 5, and the plunger 37 will be retracted. Since the feeding mechanism of the packaging machine is synchronized with the feeding mechanism of the wrapping machine at this point another cigarette package 32 will be forced downwardly into engagement with the gate 4 in front of the plunger 37. Continued rotation of the cam 45 will permit the spring 56 to again cause reciprocation of the lever and the plunger with the result that the next package will be fed into the feed trough 5.

The feeding of each successive package into the feed trough 5 causes the transverse feeding of each of the prior packages along the feed trough and the packages are successively fed to the end of the feed trough 5 into a position above the vertical folding chute 6. Should the supply of cigarette packages from the packaging machine be temporarily halted for some reason or other, the pressure upon the gate 4 will cease, with the result that under the tension of spring 34 it will assume the position shown by dotted lines at 35 in Fig. 1, so that in spite of the rotation of the cam wheel 45 the plunger 37 will not be shifted by spring 56 to cause a feeding of the packages. This is due to the fact that the end 40 of the plunger 37 engages the gate 4 and is prevented from shifting any further. This results automatically in cessation of the feeding of the "Cellophane" or other wrapping material, as will be later explained.

As the cigarette packages 32 are shifted through the transverse feed trough 5 by means of the reciprocating plunger 37, they finally reach the end thereof and are thence forced downwardly through the opening 58 formed in the bottom of the trough by means of feeding mechanism which will hereinafter be described.

A short distance beneath the opening 58 and in registry therewith is the chute or track 6 for folding the wrapping material around the sides of the package and the package leaving the trough 5 through the opening 58 is forced downwardly through the chute 6. It is at this point that the wrapping material in which the package is to be wrapped is fed to the package, the wrapping material being projected across the top of the chute 6 as indicated at 59, a sufficient length being held at this point to extend across the bottom and the two faces of the package and also sufficient to project beyond the two sides of the package so that the material can be folded around the sides of the package as will be hereinafter explained, and adhesively secured in position.

Figures 3, 14:
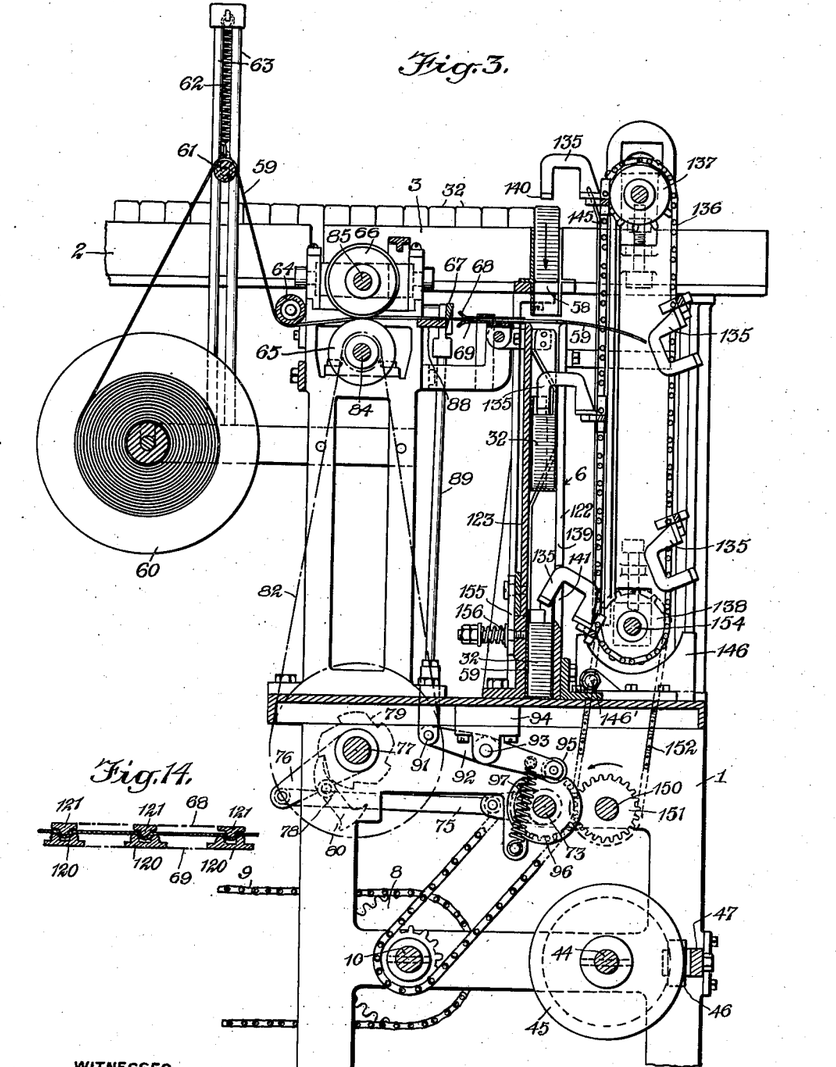
Fig. 3 is a longitudinal sectional view through the machine.
Fig. 14 is a transverse sectional view through the guide plates for the Cellophane or other wrapping material.
Figure 13:
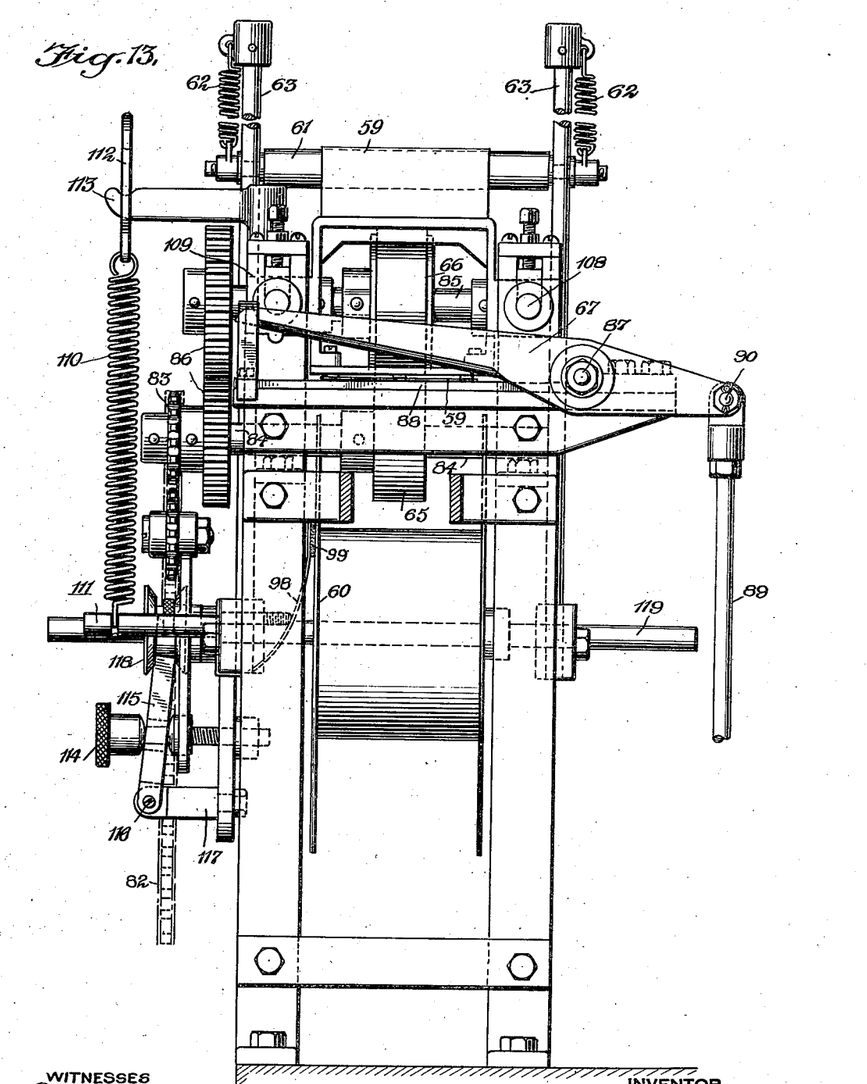
Fig. 13 is a transverse sectional view through the machine just in front of the cutting knife, with portions omitted for the sake of clarity.

The mechanism for feeding the "Cellophane" across the top of the chute 6 and for cutting off the proper length is shown most clearly in Figs. 3, 4 and 13, and consists of a roller 60 on which the supply of "Cellophane" or other wrapping material is disposed and from which it is fed upwardly over a tension roller 61 supported on the end of springs 62 in the brackets 63, and thence downwardly over the idling roller 64, through the feed rollers 65 and 66, whence it is fed beneath the knife blade 67 between the guide plates 68 and 69, and thence over the top of the chute 6, as is most clearly shown in Fig. 3. The feed rollers are operated so as to feed the proper length of wrapping material across the top of the chute 6 at the proper time, that is, just before a package is forced downwardly into the chute.

The operating mechanism for the feed rollers comprises a sprocket 70 mounted on shaft 10, connected by a roller chain 71 to a sprocket 72 mounted on a shaft 73, which in turn has a lever 74 keyed thereto, which is connected by a link 75 to a lever 76 mounted on shaft 77 so as to freely rotate with respect thereto. The lever 75

74 is somewhat shorter than the lever 76 and rotation of the shaft 73 with the resultant rotation of lever 74 merely causes a reciprocation of the link 75 and a rocking action on the part of lever 76. Pivoted to one side of the lever 76 is a pawl 78 which is positioned so as to be engageable with a ratchet 79 keyed to shaft 77. The pawl 78 is formed with a relatively short end engageable with the teeth of the ratchet, and with a relatively enlarged end 80 which by the action of gravity normally urges the pawl into engagement with the teeth of the ratchet. The action of the links, pawl, and ratchet just described is as follows. When the shaft 73 is rotated in the direction of the arrows in Fig. 4 and the link 75 reaches the position indicated in dotted lines, it begins its initial movement towards the right as viewed in Fig. 4 and the pawl shortly thereafter engages one of the teeth of the ratchet 79, with the result that as the shaft 73 and the link 75 shift to the position shown in full lines in Fig. 4, the ratchet 79 and shaft 77 are rotated. Finally the link 75 will reach the extreme limit of its movement towards the right as viewed in Fig. 4 and upon the continued rotation of shaft 73, the link will begin to shift towards the left, with the result that the pawl 78 will slide backwardly out of engagement with the teeth of the ratchet until it again reaches the position shown in dotted lines in Fig. 4 when the action will again be repeated. This results in a periodic rotation of the shaft 77 at predetermined intervals.

Also mounted on the shaft 77 and keyed thereto is a sprocket 81, which is connected by means of a roller chain 82 to a sprocket 83 keyed on the shaft 84 which supports the feed roller 65, the shaft 84 being connected in turn to shaft 85 which supports the feed roller 66 by means of intermeshing gears 86. It will be noted that roller 66 is somewhat larger than roller 65 and the gears 86 bear a proportional size relationship to each other. In this way a periodic operation of the feed rollers 65 and 66 will result in periodic feeding of the "Cellophane" or other wrapping material at predetermined intervals. Each operation of the feed rollers results in the feeding of sufficient "Cellophane" or other wrapping material to wrap one package. The operating mechanism is so connected that the feed is accomplished as indicated in Fig. 3 just after one package has passed into the chute 6 and the next succeeding package is about to be forced downwardly into the chute.

After the "Cellophane" has been fed forwardly over the chute 6 as indicated, it is necessary to sever the desired length and this is accomplished by means of the knife 67 pivotally mounted at 87 between the feed rollers and the guide plates 68 and 69. The knife is likewise connected to the operating mechanism of the machine and is so arranged as to automatically operate and sever the desired length of "Cellophane" after it has been fed forwardly to the position shown in Fig. 3. The knife 67 is provided with a sharpened edge which severs the "Cellophane" or other wrapping material at the edge of the platen 88 to which it is pivoted and over which the wrapping material is fed.

The operation of the knife is accomplished by means of a link 89 pivoted at one end as at 90 to the knife, and at its lower end it is pivoted as at 91 to an arm 92, which in turn is pivoted at 93 to a bracket 94. The opposite end of the arm 92 is provided with a follower or roller 95 which is held in engagement with a cam wheel 96 keyed to shaft 73 by means of a spring 97. When the roller or follower 95 is urged into contact with the rest portion of the cam by means of spring 97, as shown in Fig. 3, the link 89 will be forced upwardly causing the knife to pivot downwardly to the position shown in Fig. 3 and sever the strip of wrapping material. When the cam 96 continues to rotate with the further operation of the machine and the dwell portion thereof comes into contact with the roller 95, the link 89 is shifted downwardly with the result that the knife 67 pivots upwardly to the position shown in Fig. 13, leaving the feed path free for further "Cellophane" or other wrapping material to be fed forwardly through the guide plates 68 and 69. When the next length of wrapping material is thus fed forwardly to the position shown in Fig. 3, the cam 96 will be rotated sufficiently for the dwell portion thereof to engage the follower 95 with the result that the knife will again lower and sever the wrapping material.

The supply roll 60 and the feeding mechanism for the wrapping material are provided with suitable drags to prevent the continued rotation of the rollers and cylinders after the proper length of material has been fed forwardly. The drag mechanism for the supply roll is shown most clearly in Fig. 13 and comprises a spring strip 98 mounted in the frame and having a felt or similar head 99 engaging against the side of the supply roll 60. The feeding mechanism for the feed rollers 65 and 66 is likewise supplied with a drag mechanism in the form of a sprocket 100 mounted on a frictional drag 101 (see Fig. 2), the sprocket being positioned so as to engage the roller chain 82 and prevent its continued rotation after the link 75 has reciprocated in the manner hereinbefore described.

To prevent the continued operation of the feeding mechanism for the wrapping material with the resultant waste of the material in the event that the supply of cigarette packages is temporarily halted, I provide an automatic cutoff which prevents the feeding of the wrapping material when the plunger 37 is held in retracted position. It will be recalled that when the supply of cigarette packages entering the feed trough 3 has been cut off and the packages no longer press upon the gate 4 to hold it in the position shown in full lines in Fig. 1, under the action of spring 34 the gate assumes the position shown by dotted lines at 35 in Fig. 1, with the result that it engages the abutment 40 on the end of plunger 37 and prevents its reciprocation. When this takes place, the feeding mechanism for the wrapping material likewise will cease to operate. This is due to the provision of a slide 103 mounted in brackets 104 on the frame in such a manner that it can shift within limits to the left and right as viewed in Fig. 4. One end of the slide 103, indicated at 105, serves as a trip for the end 80 of the pawl 78 when the slide 103 is shifted towards the right as viewed in Fig. 4. The end 105, when the slide is shifted to the right, is in the path of movement of the end 80 of the pawl, with the result that the pawl will be pivoted around its mounting on the arm 76 and will cause the opposite end of the pawl to be shifted out of engagement with the teeth of the ratchet, with the result that the link 75 will be shifted to the right as viewed in Fig. 4 without interengagement between the pawl and ratchet, and with the result that the shaft 77 will not rotate. The slide 103 is caused automatically to shift into the path of movement of the pawl 78 by means of its connection with the operating plate 106 mounted on the lever 52, which it will be recalled forms part of the operating mechanism for the plunger 37. The formation of the connecting operating plate 106 is most clearly shown in Fig. 1, where it will be seen that it is provided with a diagonal slot 107 into which the end of the slide 103 projects. Due to the angle of the slot 107 the slide 103 is projected into the path of movement of the pawl so as to trip it when the lever 52 is in the position indicated in Fig. 5 with the plunger 37 in retracted position and as long as the plunger remains in retracted position the pawl 78 will be tripped by the end 105 of the slide 103, with the result that the wrapping material will not be fed as long as the plunger 37 remains in retracted position.

When the plunger is shifted forwardly by the levers and the lever 52 assumes the position shown in dotted lines in Fig. 5, the plate 106 will cause the slide 103 to retract out of the path of movement of the pawl 78, with the result that when the plunger 37 has reciprocated to feed the packages of cigarettes along the transverse chute 5, the feeding mechanism for the wrapping material can operate. It will be appreciated that due to the provision of the slide 103, whenever the supply of cigarette packages has been cut off and the gate 4 has shifted to the position shown in dotted lines at 35 in Fig. 1, not only will the plunger 37 be held in retracted position but also the feeding mechanism for the wrapping material will no longer operate, thereby preventing any waste of the material.

To facilitate the feeding of the wrapping material through the feed rollers 65 and 66 when the mechanism is being threaded, the portion of the frame carrying the upper feed roller 66 is hinged as at 108 to the lower portion of the frame so that the opposite side, indicated at 109, may be pivoted upwardly raising the rollers 66 out of engagement with the roller 65, as most clearly shown in Fig. 13. The roller 66 is normally held in engagement with the roller 65 by means of a spring 110 secured at its lower end to a spindle 111 and at its upper end connected to a yoke 112 which is removably hooked over the bracket 113 secured on the part 109.

The supply roll 60 for the wrapping material may be adjusted laterally so as to bring it into proper alignment by means of a knurled adjusting screw 114 shown in Fig. 13. The knurled adjusting screw has a portion of reduced diameter which extends through an opening in the adjusting lever 115 and thence is threaded into the frame of the machine. The lever 115 is pivoted at one end, indicated at 116, to a bracket 117 carried by the frame, and its opposite end engages a grooved wheel 118 keyed to the end of a shaft 119 on which the supply roll 60 is mounted. By screwing the adjusting screw 114 inwardly the feed roller will be shifted to the right, and unscrewing the adjusting member 114 will cause the feed roller to shift to the left as viewed in Fig. 13.

It will be observed that when the wrapping material is fed forwardly from the feed rollers 65 and 66, it passes over platen 88 beneath the knife 67 between the guide plates 68 and 69 and thence across the top of the folding chute 6 where it projects forwardly as indicated at 59. To give body to the wrapping material and prevent it from bending downwardly too freely at the end thereof after it has passed through the guide plates 68 and 69, I provide the guide plates with interengaging ribs (see Figs. 13 and 14), which will serve to give a slight longitudinal set or fold to the wrapping material and thereby reduce to a slight degree the longitudinal flexibility thereof.

It will be seen that the plate 69 is provided with a series of longitudinally extending grooves 120 and that the plate 68 is provided with a corresponding series of ribs 121 positioned so as to project into the grooves in the plate 69. The "Cellophane" or other wrapping material passing between the guide plates will thereby have a series of longitudinal ribs or grooves impressed thereon with the result that the material can be fed outwardly through the forward end of the guide plates as shown at 59 without depending downwardly at too sharp an angle.

As has been previously explained, when a cigarette package reaches the end of the transverse feed chute 5, it is forced downwardly through the opening 58 and the lower end thereof will come into contact with the upper surface of the wrapping material at adjacent the center thereof. In practice, one end of the wrapping material is slightly longer than the other end so that at the top thereof the superimposed layer will overhang to a slight extent to facilitate opening of the package. However, this is a mere expedient for convenience and it is not necessary.

As the package is forced downwardly into the folding chute 6, the two faces thereof, indicated at 122 and 123, will engage the two ends of the wrapping material and force it upwardly over the front and rear faces respectively of the cigarette package. The wrapping material is wider than the package so that the lateral edges thereof can be wrapped around the sides of the package and will overlap to a slight degree. The folding chute 6 is provided with a pair of similar sides indicated at 124, shown most clearly in Fig. 4, extending between the faces 122 and 123, which serve to wrap the lateral edges of the wrapping material around the sides of the package and adhesively secure them in position. The sides 124 consist of a series of plates formed with slots which engage the lateral edges of the wrapping material and fold them over one at a time. The uppermost plate on the side 124 consists of a small plate 125 held in position by means of a bracket 126, and is spaced from faces 122 and 123 thereby providing a pair of slots 127 and 128, the slot 128 being positioned beneath the bracket 126 which is bridged over the top thereof.

As previously stated, the two sides 124 are similar and when the package is forced downwardly each side thereof first comes into contact with the top of the plate 125, which is preferably slightly rounded or tapered and which tucks the bottom of the wrapping material on the two sides of the package upwardly against the sides of the package. The lateral edges of the wrapping material on both sides of the package will then project outwardly through the slots 127 and 128 formed in the two sides 124, and as the package is forced downwardly the edges of the wrapping material slide downwardly along the slots. Each slot 128 extends diagonally across the side 124, as indicated at 129, with the result that one lateral edge of the wrapping material on each side of the package will be folded against the respective sides of the package when the diagonal portion 129 is reached. The other lateral edge on each side of the package continues to slide downwardly in its slot 127 for some distance below the diagonal slot 129 until the slot 127 extends diagonally across the side 124 in the opposite direction to the portion 129, as indicated at 130. When the diagonal portion 130 is reached the other lateral edge on each side of the package is caused to fold downwardly on top of the first lateral edge.

So that the lateral edges will be adhesively secured together in superimposed position, an adhesive is supplied to each side of the package after the first edge has been folded down and prior to the folding down of the second edge. This is accomplished by means of the feed ducts 131 feeding into the small reservoirs 132 from which wicks lead through tubes 133 to the two sides 124 of the feed chute. The wicks or tubes 133 feed into the sides of the folding chute beneath the diagonal portions 129 of the slots 128, with the result that the outer surface of the first lateral edge which is folded down is wiped with an adhesive, and when the second lateral edge is folded downwardly by means of the diagonal slot 130 it will be superimposed on top of the adhesive. Near the lower end of the chute a pair of heaters, such as the electric heaters 134, are provided on the two sides thereof to dry the adhesive and cause it to set more rapidly. Thus it will be seen that when the package has been shifted to the bottom of the chute 6, wrapping material has been secured around the bottom, the two faces, and the two sides thereof. As the material is slightly longer than the package, it projects upwardly over the top of the package and all that remains to be done after the package reaches the bottom of chute 6, is to fold the material over the top and adhesively secure it in position.

While it has been stated that the packages are fed downwardly through the chute 6, the mechanism for feeding the packages has not as yet been described. This mechanism comprises a plurality of feeding plungers or fingers 135, each of which is secured between a pair of roller or block chains 136, which in turn extend between a pair of sprockets 137 at their upper ends and a pair of sprockets 138 at their lower ends. The chains 136 are disposed a short distance away from the face 122 of the chute 6 and the face 122 is provided with a longitudinally extending slot 139 most clearly shown in Fig. 5, through which the plungers or fingers 135 project into the chute. Rotation of the chain in a counterclockwise direction, as viewed in Fig. 3, causes the flat surface 140 at the end of each successive finger or plunger 135 to engage the top of a cigarette package and to force it downwardly through the chute. The slot 139 merges at its lower end with an enlarged opening 141 through which the flat head 140 of each plunger or finger may be withdrawn when the package has reached the bottom of the chute.

Figures 6, 7, 8, 9:
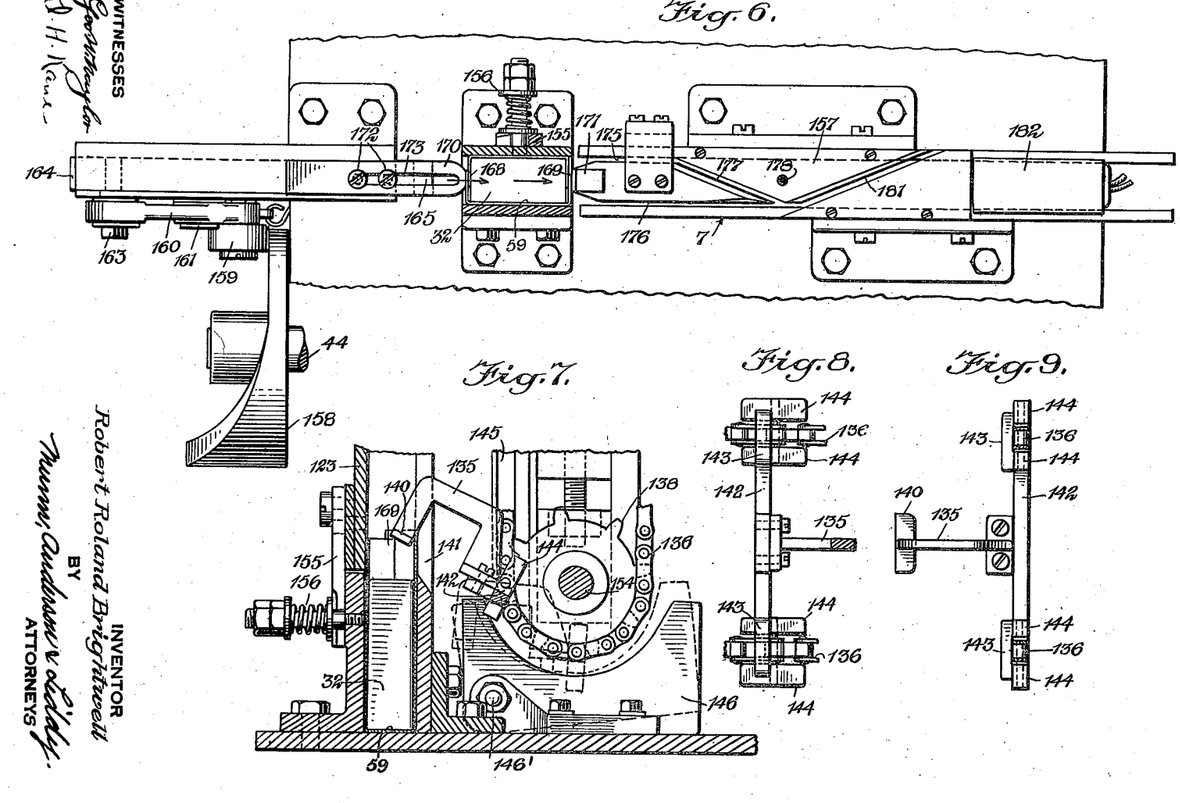
Fig. 6 is a detail plan view of the transverse folding chute for folding the wrapper over the top of the package.
Fig. 7 is a sectional view in elevation of the lower portion of the vertical feed folding chute and of the lower end of the feeding mechanism for feeding the packages through the vertical folding chute.
Figs. 8 and 9 are detail views of the fingers and mountings therefor forming part of the mechanism for feeding the packages through the vertical folding chute.

The structure of the fingers or plungers 135 and the mechanism whereby they are suspended between the chains in such a manner as to be held in proper position and so as to be automatically withdrawn through the opening 141 at the bottom of chute 6, is most clearly shown in Figs. 8 and 9. Each plunger is connected adjacent the central portion of a transverse bar 142 extending between the two chains 136, and at each end the bar is provided with an offset portion 143 bridged around the chain and which connects at each side of each chain with shoes 144. The shoes on each side in turn are pivoted to one of the roller links of the chain, as indicated in dotted lines in Fig. 8.

So that the fingers or plungers 135 will be held in proper feeding position when they are shifted downwardly through the chute 6, I provide a pair of guides 145 adjacent each chain in a position to engage the shoes 144 and hold them in vertical position, with the result that the fingers 135 will project outwardly into the chute 6, as most clearly shown in Figs. 1 and 3. Adjacent the lower end of the chains I provide a pair of semi-circular guides or cams 146, one beneath each of the sprocket wheels 138 and positioned so as to engage the bridged portion 143 of the finger mountings and cause the fingers to pivot upwardly as indicated in Fig. 3 and withdraw through the opening 141. The guides or cams 146 are pivotally mounted at their forward ends as indicated at 146', so that continued feeding of the fingers 135 results, through the interengagement between the bridged portion of the mounting 143 and the cam surface, in the pivoting of the guides or cams to the position indicated in dotted lines in Fig. 7 so as to permit sufficient clearance for the bridged portion. Also, adjacent the upper sprockets 137 guide members are provided in the form of disks 147 which are positioned to engage one of the shoes 144 on either end of the supporting member 142 and to adjust the member into proper position to enter the chute 6 when it has passed over the top of the sprocket wheels 137, as shown at the upper end of Fig. 3. The guide members 147 are more clearly shown in Fig. 1.

The operation of the roller chains 136 and of the feeding fingers 135 is synchronized with the operation of the remainder of the machine so that when a cigarette package has been shifted to the end of the transverse chute 5 and the wrapping material has been fed across the top of the chute and a proper length thereof severed, one of the fingers 135 will engage the top of the package and feed it downwardly through the chute.

The mechanism for causing the rotation of the chains 136 as shown most clearly in Figs. 1, 2, and 3 comprises a pair of intermeshing gears 148 and 149, the gear 148 being keyed to shaft 73 and the gear 149 keyed to shaft 150 which in turn is connected by means of sprocket 151, chain 152, and sprocket 153 to shaft 154 on which the sprockets 138 are mounted. Through this means rotation of shaft 10 causes the rotation of shaft 73 by means of chain 71 which in turn causes the rotation of shaft 150 by means of gears 148 and 149, which action in turn causes rotation of shaft 154 through the medium of chain 152. The rotation of shaft 154 results in the feeding of chains 136, with the result that the fingers 135 will shift longitudinally of the folding chute 6 and will feed the cigarette packages therethrough.

To afford access to the inside of the chute 6 so that it may be cleaned or inspected, the face 123 is releasably held in position by means of the latch 155 pivoted adjacent its upper end to the face 123 and releasably held beneath the spring-pressed disk 156 at its lower end. The latch 155 can be released from beneath the disk 156 whenever desired, thereby freeing the face 123 from its lower fastening and permitting inspection of the inside of the chute.

When the packages reach the lower end of the chute 6 the wrapping material has been folded around the bottom, the front and rear faces, and the two sides, and the lateral edges thereof have been adhesively secured together along the two sides. The material, however, projects upwardly above the top of the package and to complete the wrapping operation it has to be folded downwardly and adhesively secured over the top of the package. This operation is accomplished while the package passed through folding chute 7, which is provided with a top member 157 corresponding to the sides 124 of the chute 6, the top 157 being provided with similar slots which result in the folding of the wrapping material over the top of the package. (See Fig. 6.)

Before the material can be folded by the slots over the top of the package, it is necessary that the material first be tucked in the two ends of the top of the package and this is accomplished by means of the feeding mechanism which feeds the packages through the chute 7. The feeding mechanism is most clearly shown in Figs. 1, 2, 5, and 6, and comprises a cam 158 mounted on the same shaft 44 which carries the cam 45. The cam 158 is provided with a cam surface on the face thereof which is engaged by a follower or roller 159 carried by the lever 160, which is pivoted at 161 to bracket 162 carried by the frame. The upper end of the lever 160 is pivoted at 163, by means of a slotted connection to permit of variations in the radius, to the slide 164 on the end of which is secured the plunger 165 which engages the cigarette packages and feeds them through the folding chute 7.

As has been previously described, the shaft 44 is caused to rotate by the primary driving shaft 10 through the medium of sprocket 41, chain 42, and sprocket 43. The cam 158 has one relatively short dwell portion, the remaining surface of the cam being a rest portion, and the follower 159 is held in contact with the cam surface by means of a spring 166 connected between the lower end of lever 160 and a pin 167 carried by the frame, with the result that as the cam 158 rotates with the shaft 44, the follower riding on the cam surface will cause the reciprocation of the lever 160 and of the plunger 165. When the follower is in contact with the rest portion of the cam, the lever and plunger will be in retracted position as indicated in full lines in Fig. 5. However, when the follower contacts the dwell portion it is forced outwardly to the position shown in dotted lines in Fig. 5 with the result that the slide 164 and the plunger 165 will be forced to the right as viewed in Fig. 5, the plunger 165 contacting the package at the bottom of the chute 6 and forcing it into the chute 7, with the result that all of the packages in the chute will be fed forwardly. A single reciprocation of the plunger 165 results in the feeding of a package a little greater distance than the width thereof.

The feeding mechanism just described which causes the feeding of the cigarettes through the folding chute 7, is so timed that the feeding occurs just after a package has been fed to the bottom of the chute 6 by means of one of the fingers 135. In this way the bottom of chute 6 is always kept free to receive the next succeeding package which is being fed through the chute 6. It will be appreciated that as each succeeding package is fed by the reciprocating plunger 165 all of the preceding packages will be fed forwardly through the folding chute 7.

The first step in folding the wrapping material over the top of the package is the tucking in of the protruding wrapping material, indicated at 168 and 169 in Fig. 6, at the sides of the top of the package. This is accomplished just as the package is being fed into the folding chute 7 by means of a pair of tucking plates indicated at 170 and 171, the tucking plate 170 being reciprocating and the tucking plate 171 being stationary. The tucking plate 170 is in the form of a slide and is secured to the top of the plunger 165 by means of a pair of screws 172 passing through a slot 173 formed in the slide so that the tucking plate can shift longitudinally with respect to the plunger. The tucking plate 170 is normally held in advanced position with respect to the plunger, that is, so that the screws are positioned at the left-hand end of the slot 173 as shown in Figs. 5 and 6, by means of a spiral spring 174 connected between a pin formed on the end of the plate 170 and a pin secured to the plunger 165.

As the plunger 165 is caused to reciprocate in feeding direction, the reciprocating tucking plate 170 first engages the wrapping material 168 at the side of the package and as the tucking plate tapers towards its outer end and is disposed at a height just above the top of the package it neatly folds a portion of the wrapping material 168 down against the top of the package. As the plunger 165 continues shifting towards the right as viewed in Figs. 5 and 6, it finally comes in contact with the side of the package and shifts it towards the folding chute 7, with the result that the stationary tucking plate 170 contacts the wrapping material 169 at the side of the top of the package, and since the stationary plate 171 tapers towards the end as does the plate 170 and is disposed just above the top of the package, it folds the material 169 flat against the top of the package.

As the plunger continues its reciprocating movement towards the right as viewed in Figs. 5 and 6, the end of the plate 170 finally contacts the plate 171, and since the plate 170 is provided with a slotted connection it is held in a stationary position while the plunger 165 continues towards the folding chute 7, entering a short distance therein and feeding the cigarette package therein.

As the package enters the folding chute 7, the wrapping material extending above the top at the two faces thereof enters the slots 175 and 176 formed adjacent the two sides of the top 157 of the chute 7 which correspond in function and structure to the slots 127 and 128 in the chute 6. As the package is fed along the chute the projecting upper ends of the wrapping material slide along the slots 175 and 176 until the diagonal portion of the slot 175, indicated at 177, is reached where one projecting edge of the wrapping material will be folded downwardly on top of the package.

After the first edge of the wrapping material has been folded down on top of the package, adhesive is applied to the upper surface thereof in the same manner as in the chute 6. The apparatus for supplying the adhesive consists of a wick disposed in tube 178 and extending between the top of the inside of the chute and a reservoir 179 to which an adhesive is supplied by means of tube 180. When adhesive has thus been applied to the upper surface of the folded-over edge of the wrapping material, the other edge of the wrapping material enters the diagonal portion 181 of the slot 176, with the result that it will be folded over on top of the first edge. As the package is fed forwardly it finally passes beneath a heater, such as the electric heater 182, for drying the adhesive and causing it to set properly. Thence the package is ejected from the chute 7 and may be received in a suitable receptacle.

It will be appreciated that when the package is ejected from the chute 7, it is completely encased in the "Cellophane" or other wrapping material which has been employed and that the wrapping material is neatly and securely fastened about the package.

As the operation of the machine has been described in connection with the description of its construction, it is unnecessary to again review the operation of the machine in detail. The cigarette package or other article which is to be wrapped enters the machine through the feed trough 3 and forces the gate 4 back to the position shown in full lines in Fig. 1 where the reciprocation of lever 37 causes the feeding of the package transversely of the machine through the feed trough 5. When the package reaches the end of the feed trough 5 it is fed downwardly through the opening 58 in the bottom of the feed trough by means of one of the fingers 135. Just at the top of the folding chute 6 the package picks up the strip of "Cellophane" or other wrapping material which has been cut to the proper size, and is then forced downwardly through the folding chute 6 with the result that the "Cellophane" or other wrapping material is secured over the bottom and the two faces of the package and is folded around the two lateral sides and adhesively secured in position. When the package reaches the bottom of the folding chute 6, it is then fed by means of the plunger 165 through the folding chute 7, with the result that the "Cellophane" or other wrapping material is folded over the top of the package and adhesively secured in position.

Should the machine for any reason jam, the automatic release provided in association with the primary sprocket wheel 8 will cause the operation of the mercury switch 29 with the resulting cutting off of the power which operates the machine. Should for any reason the supply of cigarettes entering the machine be cut off the gate 4 will pivot forwardly under the influence of spring 34, and assume the position shown in dotted lines at 35 in Fig. 1, preventing the reciprocation of the feed plunger 37 and resulting in the cessation of operation of the rollers which feed the wrapping material.

All of the feeding mechanism and associated moving parts are operatively connected with the primary sprocket 8 with the result that all of the parts operate in synchronism.

From the herein described embodiment of my invention it will be appreciated that I have provided an improved wrapping machine for wrapping packages of cigarettes or other articles in "Cellophane" or other flexible sheet material, which may be connected directly to a packaging machine so that the cigarette packages or other articles are fed directly into the machine without the necessity of manually transferring the packages from one machine to another, and in which the article is encased in a neat yet secure manner in a wrapping of Cellophane or other wrapping material in a minimum of time and with a minimum of expense. It will also be appreciated that the wasting of wrapping material and the danger of crushing the cigarette packages or other articles being wrapped, or of breaking the machine, is reduced to a minimum by reason of the automatically operating safety switch and the automatic cut off of the paper feed.

While in the accompanying drawings and the herein contained description I have illustrated and described a preferred embodiment of my invention, it is to be understood that modifications can be made without departing from the invention as set forth in the accompanying claims.

The term "adhesive" as used herein with regard to tubes 133 and 178 includes not only cementitious or gummy substances but also a solvent for the "Cellophane" or other wrapping material. It should also be understood that while the invention has been illustrated as embodied in a machine for wrapping cigarette packages in "Cellophane" or the like, it may also be utilized in machines for wrapping other articles, packages, or containers in other forms of flexible sheet wrapping material.

I claim:

1. In a machine for wrapping an article in flexible sheet wrapping material, a folding chute, a stationary plate mounted on the folding chute adjacent the beginning thereof, a reciprocating plunger for feeding the article to be wrapped through the folding chute, and a reciprocating plate in the same plane as the stationary plate mounted on the plunger so as to have limited relative movement with respect thereto but normally held by a spring in advanced position, said reciprocating and stationary plates being adapted to engage portions of the wrapping material on opposing sides of the article to be wrapped and fold it against one surface thereof, and said folding chute being provided with means for folding the remaining portions of the wrapping material against the same surface of the article.

2. In a machine for wrapping an article in flexible sheet material, a first feed trough through which the articles to be wrapped are supplied to the machine, a second feed trough disposed at the end of the first feed trough and transversely thereof, a reciprocating arm for feeding the articles from the first feed trough into the second feed trough, a pivotally mounted abutment member forming the end of the first feed trough and shiftable into the path of movement of the arm so as to prevent reciprocation thereof, a stop for engaging the abutment member and for limiting the outward movement thereof so that it stops the articles at the end of the first feed trough and at the entrance to the second feed trough, and means including a spring for drawing the abutment member into the path of movement of the arm when the supply of packages in the first feed trough is interrupted.

3. In a machine for wrapping an article in flexible sheet wrapping material, a folding chute, a stationary tucking plate formed at the top of the folding chute and projecting from the forward end thereof, a reciprocating plunger for feeding the articles to be wrapped through the folding chute, a reciprocating tucking plate mounted on the plunger and positioned in the same plane as the stationary plate, said reciprocating plate having limited movement relative to the plunger, and means including a spring for normally holding the reciprocating plate in advanced position with respect to the plunger, said reciprocating and stationary plates being adapted to engage portions of the wrapping material on opposite sides of the article to be wrapped and fold it against one surface thereof, and said reciprocating plate being adapted to engage the stationary plate when the plunger approaches the folding chute, said spring permitting further movement of the plunger.

ROBERT ROLAND BRIGHTWELL.